(12) United States Patent
Itoh

(10) Patent No.: US 9,993,903 B2
(45) Date of Patent: Jun. 12, 2018

(54) WORKPIECE SUPPLY DEVICE AND MACHINE TOOL

(71) Applicants: CITIZEN WATCH CO., LTD., Tokyo (JP); CITIZEN MACHINERY CO., LTD., Nagano (JP)

(72) Inventor: Shingo Itoh, Hanamaki (JP)

(73) Assignees: CITIZEN WATCH CO., LTD., Tokyo (JP); CITIZEN MACHINERY CO., LTD., Nagano (JP)

( * ) Notice: Subject to any disclaimer, the term of this patent is extended or adjusted under 35 U.S.C. 154(b) by 0 days. days.

(21) Appl. No.: 15/516,882

(22) PCT Filed: Sep. 10, 2015

(86) PCT No.: PCT/JP2015/075673
§ 371 (c)(1),
(2) Date: Apr. 4, 2017

(87) PCT Pub. No.: WO2016/056344
PCT Pub. Date: Apr. 14, 2016

(65) Prior Publication Data
US 2017/0312873 A1    Nov. 2, 2017

(30) Foreign Application Priority Data

Oct. 7, 2014  (JP) ................................. 2014-206538

(51) Int. Cl.
*B23Q 7/04* (2006.01)
*B23Q 11/08* (2006.01)

(52) U.S. Cl.
CPC ................ *B23Q 7/04* (2013.01); *B23Q 11/08* (2013.01)

(58) Field of Classification Search
CPC . B23Q 11/08; B23Q 11/0825; B23Q 11/0866; B23Q 11/0891; B25Q 7/08; B25Q 7/04; B25Q 7/045; B25Q 7/046
See application file for complete search history.

(56) References Cited

U.S. PATENT DOCUMENTS 5,669,751 A    9/1997   Hoffman et al.
9,266,210 B2   2/2016   Ando et al.

FOREIGN PATENT DOCUMENTS

JP    3-109704 U   * 11/1991
JP    11-99402 A      4/1999
(Continued)

OTHER PUBLICATIONS

International Search Report for PCT/JP2015/075673 dated Nov. 17, 2015 in 2 pages.
(Continued)

*Primary Examiner* — Gerald McClain
(74) *Attorney, Agent, or Firm* — Knobbe, Martens, Olson & Bear LLP

(57) ABSTRACT

A workpiece supply device is provided that is capable of supplying a workpiece to be machined next in a supplying area of the workpiece outside a machining area while the machining area is closed to control scattering of cutting fluid from the machining area during the machining of the workpiece. A machine tool includes a machining room of the workpiece, a loader room, a dividing wall having an opening part, a main spindle, a workpiece supply device, a delivery device, and an ejection device. The workpiece supply device includes a workpiece holder, a movement mechanism, a cover member, and a coil spring. The coil spring biases the cover member to close the opening part by the cover
(Continued)

member such that the workpiece holder holds the workpiece in the loader room during the machining of the workpiece in the machining room.

3 Claims, 7 Drawing Sheets

(56) References Cited

FOREIGN PATENT DOCUMENTS

| | | | |
|---|---|---|---|
| JP | 11099402 A | * | 4/1999 |
| JP | 2000-61704 A | | 2/2000 |
| JP | 2000061704 A | * | 2/2000 |
| JP | 2005-161420 A | | 6/2005 |
| JP | 2014-54676 A | | 3/2014 |
| KR | 10-0779805 | | 11/2007 |

OTHER PUBLICATIONS

Office Action in corresponding Korean Patent Application No. 10-2017-7008868; dated Mar. 27, 2018. (with English Translation).

* cited by examiner

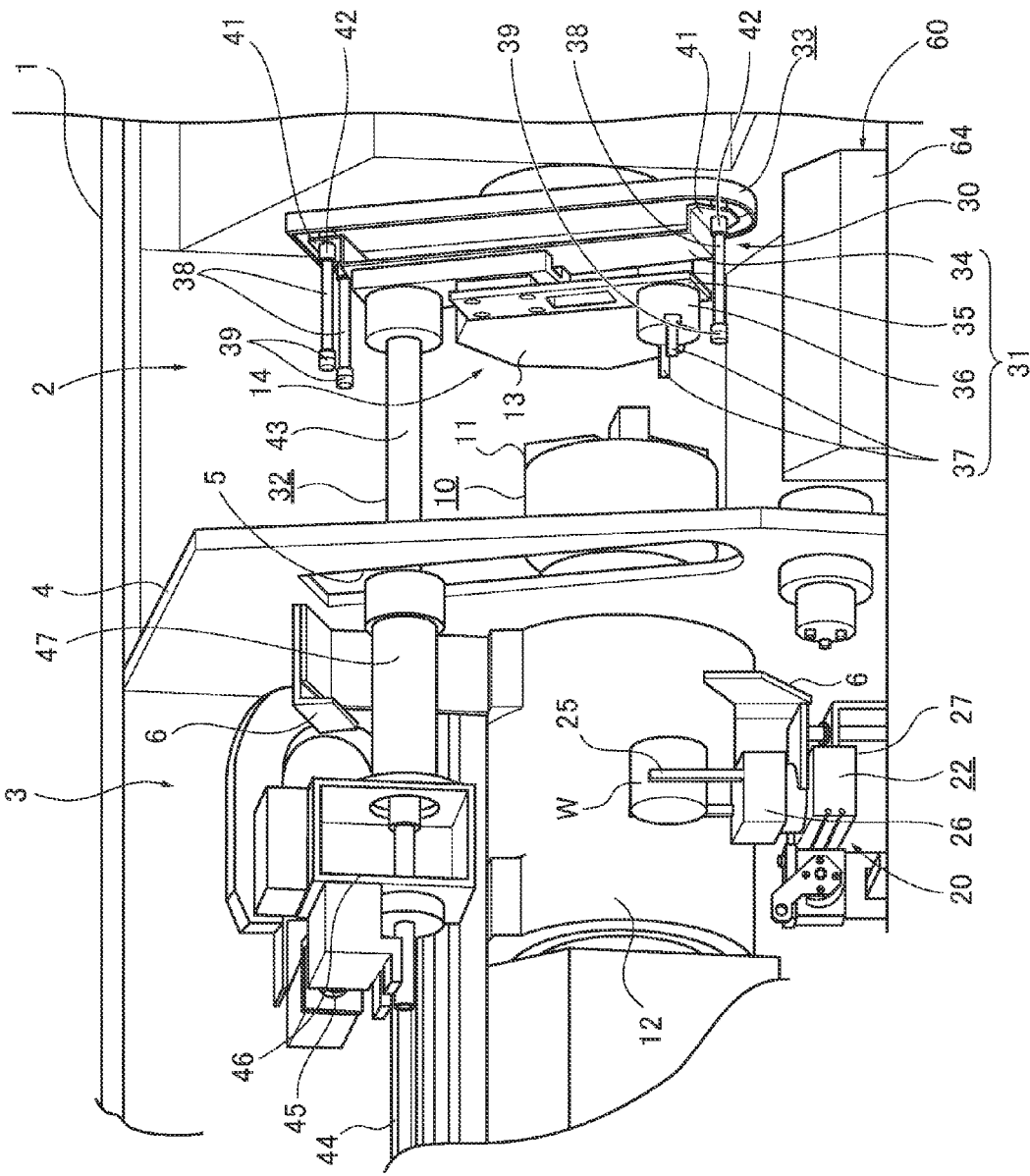
FIG.2
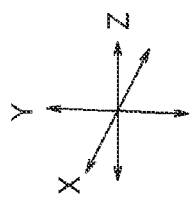

WORKPIECE SUPPLY DEVICE AND MACHINE TOOL

CROSS-REFERENCE TO RELATED APPLICATIONS

This application is the U.S. National Phase under 35 U.S.C. § 371 of International Application No. PCT/JP2015/075673, filed Sep. 10, 2015, which claims priority to Japanese Patent Application No. 2014-206538, filed Oct. 7, 2014. The entire contents of these applications are incorporated herein by reference.

TECHNICAL FIELD

This invention relates to a workpiece supply device that supplies a workpiece for a machine tool such as an automatic lathe, and a machine tool including the workpiece supply device.

BACKGROUND ART

A machine tool such as an automatic lathe including a workpiece supply device that supplies a workpiece to a machining area for a workpiece (machining material) has been known (see Patent Literature 1, for example). In the workpiece supply device (loader) of Patent Literature 1, a loader head holds the workpiece supplied outside the machining area, and the loader head enters the machining area through an opening part provided in a body cover that covers the machining area to transfer the workpiece to a main spindle of the machine tool. A movement mechanism of the loader head is provided with a shielding plate capable of closing the opening part. The shielding plate closes the opening part while the loader head locates in the machining area. The closing of the opening part by the shielding plate prevents moisture and mist of cutting fluid filled in the machining area from scattering outside the machining area through the opening part.

When the loader head moves outside the machining area after the transferring of the workpiece is completed, the shielding plate separates from the opening part to open the opening part. The body cover is provided with a shutter, which closes the opening part in an openable and closeable manner, separately from the shielding plate. By closing the opening part with the shutter after the workpiece is supplied by the loader, for example, the cutting fluid and the moisture are prevented from scattering outside the machining area through the opening part during the machining of the workpiece.

SUMMARY

In the above conventional art, as the shutter is however provided separately from the shielding plate, and an opening and closing device for the shutter is further provided, it is necessary to acquire a space for installing and operating the shutter and the opening and closing device, resulting in an increase in size of the machine tool and also in the number of components as well as the assembling steps.

The present invention has been made in view of the above circumference, and an object of the present invention is to provide a workpiece supply device capable of supplying a workpiece to be machined next in the supplying area of a workpiece outside the machining area while the machining area is closed to control the scattering of the cutting fluid from the machining area in the machining of the workpiece.

A workpiece supply device according to the present invention includes a workpiece holder that holds a workpiece to be supplied to a machine tool including a supplying area and a machining area of the workpiece, the workpiece holder entering and leaving both of the supplying area and the machining area through an opening part provided in a dividing member between the supplying area and the machining area to transfer the workpiece with the machine tool, a movement mechanism that moves the workpiece holder between the supplying area and the machining area, a cover member that moves integrally with the workpiece holder and closes the opening part when the workpiece holder moves in the supplying area, and a biasing member that biases the cover member in a closing direction of the opening part. The biasing member is configured to press the cover member to the dividing member to close the opening part by the cover member such that the workpiece holder holds the workpiece in the supplying area while the workpiece is machined in the machining area.

A machine tool according to the present invention includes the above-described workpiece supply device.

According to the present invention, a simplified workpiece supply device is capable of supplying a workpiece to be machined next in a supplying area of the workpiece outside the machining area while the machining area is sealed to control the scattering of cutting fluid from the machining area to the supplying area during the machining of the workpiece. Further, with this workpiece supply device, the scattering of cutting fluid or the like during the machining of the workpiece is effectively controlled, and a further simplified and downsized machine tool is provided.

BRIEF DESCRIPTION OF DRAWINGS

FIG. 2 is an enlarged perspective view illustrating a main part of the workpiece supply device illustrated in FIG. 1.

DETAILED DESCRIPTION

Figure 1:
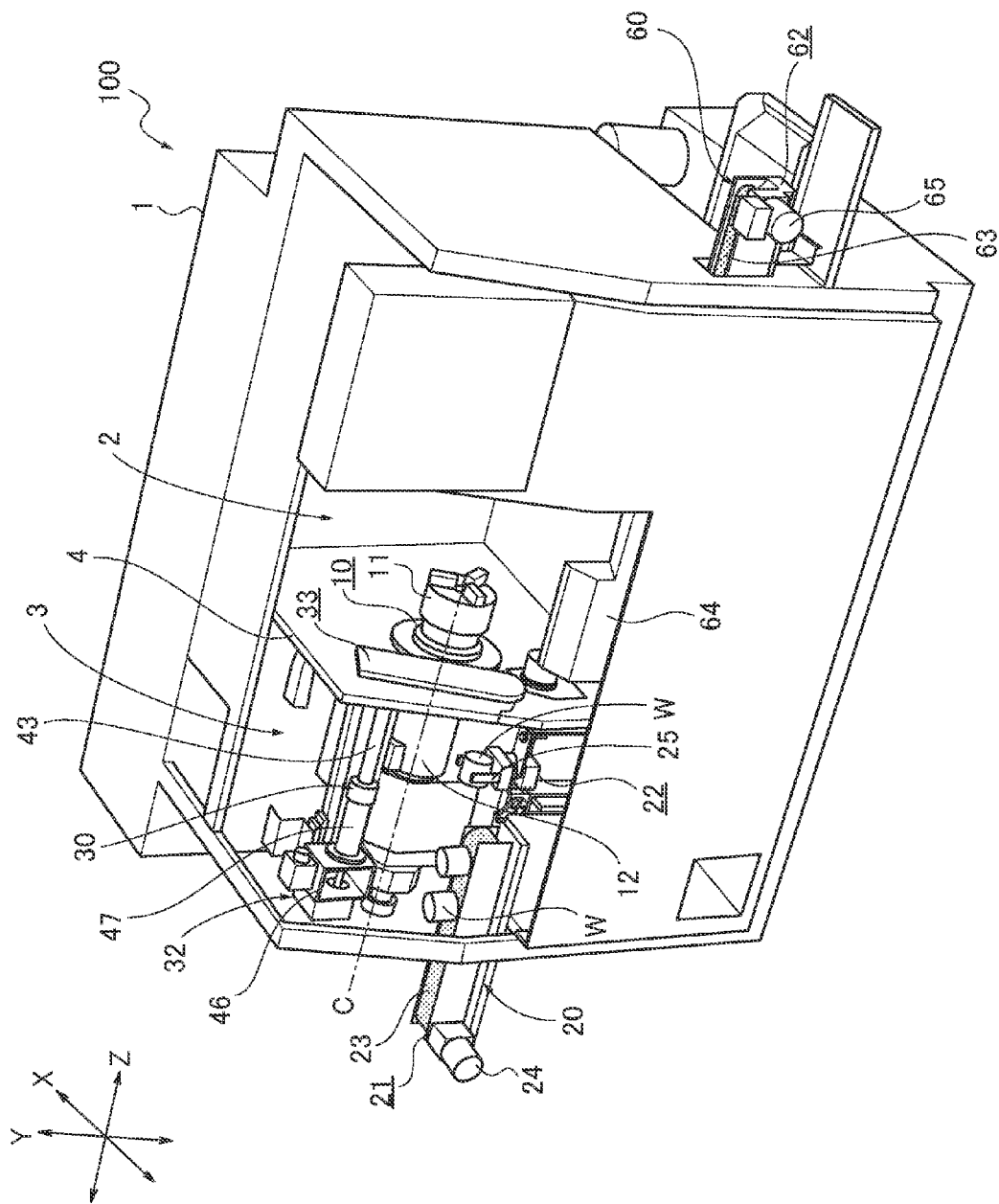
FIG. 1 is a perspective view illustrating schematic external appearance of a machine tool including a workpiece supply device according to one embodiment of the present invention.

Hereinafter, one embodiment of a machine tool (automatic lathe) including a workpiece supply device according to the present invention will be described with reference to the drawings. FIG. 1 is a perspective view illustrating schematic external appearance of an automatic lathe including the workpiece supply device of the present embodiment. In addition, although the machine tool of the present embodiment is covered by a cover, the illustration of a part of the cover is omitted in FIG. 1 for easily understanding the internal structure.

As illustrated in FIG. 1, in an automatic lathe 100, a main spindle 10 is disposed in a main body 1. The main spindle 10 is provided with a chuck 11 that grips a workpiece W. The main spindle 10 is rotatably supported by a spindle headstock 12. In this embodiment, a direction along a main spindle axis C is a Z axis direction, a horizontal direction orthogonal to the Z axis direction is an X axis direction, and a vertical direction orthogonal to the Z axis direction and the Z axis direction is a Y axis direction. A tool post 14 (see FIG. 2) including a turret 13 that holds a tool is provided in accordance with the main spindle 10 to be movable in the X, Y, Z axis directions.

The main body 1 includes a machining room (machining area) 2 for machining the workpiece W, and a loader room (supplying area) 3 having a workpiece supply device 30 that supplies the workpiece W to the main spindle 10. The loader room 3 is adjacent to the machining room 2. A leading end part of the main spindle 10 is disposed in the machining room 2. A delivery device 20 that delivers the workpiece W to the workpiece supply device 30 is provided in the loader room 3.

The loader room 3 is an area in which the workpiece supply device 30 receives the workpiece W delivered from the delivery device 20 and holds the workpiece W. The machining room 2 is an area in which the workpiece W gripped by the main spindle 10 is machined, for example, is cut by a tool selected by the tool post 14. During the machining of the workpiece W, as cutting fluid is supplied near a machining point, the cutting fluid scatters in the machining room 2, and the moisture and the mist of the cutting fluid are filled in the machining room 2.

To prevent such cutting fluid, moisture, mist and the like from scattering in the loader room 3, the loader room 3 and the machining room 2 are isolated by a dividing wall 4. As illustrated in FIG. 2, the dividing wall 4 is provided with an opening part 5 through which a workpiece holder 31 of the workpiece supply device 30 enters and leaves the loader room 3 and the machining room 2.

The delivery device 20 includes a conveyor device 21 and a transfer device 22. The transfer device 22 is disposed between the conveyor device 21 and the workpiece supply device 30. The conveyor device 21 delivers the workpiece W from the outside of the main body 1 to the loader room 3. The conveyor device 21 includes a belt conveyor 23 on which the workpiece W is placed to be delivered and a driving mechanism 24 that drives the belt conveyor 23.

The transfer device 22 transfers the workpiece W delivered in the loader room 3 from the conveyor device 21 to the workpiece supply device 30. The transfer device 22 includes a pair of hands 25, a support table 26, and a turning mechanism 27. A pair of hands 25 is provided in the support table 26, and is driven in an openable and closeable manner by an appropriate opening and closing device. The turning mechanism 27 turns the support table 26 together with the hands 25 between the delivery device 20 and the workpiece supply device 30.

A pair of hands 25 in the transfer device 22 opens by the opening and closing device. As illustrated by the two-dot chain line in FIG. 4, the turning mechanism 27 turns the support table 26 in the direction of the conveyor device 21 such that both of the hands 25 are horizontally located. The workpiece W is thereby inserted between both of the horizontally located open hands 25. Both of the hands 25 holds the workpiece W on the conveyor device 21 by closing both of the hands 25 in which the workpiece W is inserted. Next, the turning mechanism 27 turns the support table 26 at 90° in the direction of the workpiece supply device 30 such that both of the hands 25 are vertically located, as illustrated by the solid line in FIG. 4. With the above operations, the workpiece W is disposed in a predetermined position (holding position) at which the workpiece supply device 30 holds the workpiece W.

As illustrated in FIG. 2, the workpiece supply device 30 includes the workpiece holder 31, a movement mechanism 32, and a cover member 33. The workpiece holder 31 holds the workpiece W. The movement mechanism 32 moves the workpiece holder 31 to the holding position of the workpiece W and the transferring position to the main spindle 10. The cover member 33 opens and closes the opening part 5 of the dividing wall 4.

The workpiece holder 31 includes a base plate 34, an arm part 35, and a loader head 36. The arm part 35 is fastened to the base plate 34. The loader head 36 is provided in one end of the arm part 35.

The loader head 36 is provided with a pair of hands 37 which is openably and closeably driven by an appropriate opening and closing device. The workpiece W is inserted between the open hands 37, and the workpiece W is sandwiched by both of the hands 37 by closing both of the hands 37 with the opening and closing device to hold the workpiece W.

Figure 4:
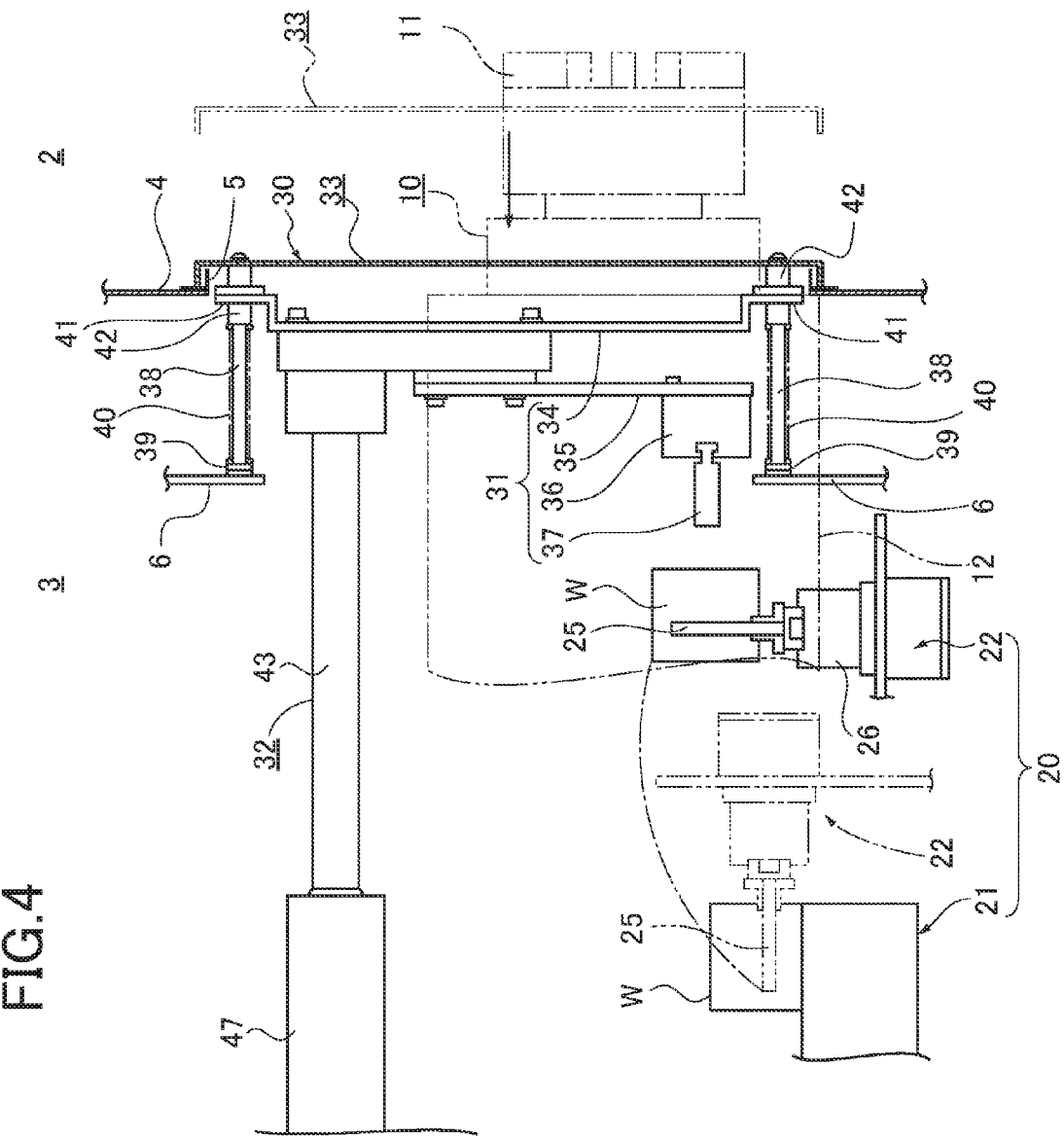
FIG. 4 is an operation view of the workpiece supply device illustrated in FIG. 1, and illustrating an opening part closed by a cover member and a workpiece holder located in a loader room.

The cover member 33 is disposed in the machining room 2, and covers the opening part 5 from the inside of the machining room 2 to close the opening part 5. The cover member 33 has an area larger than the opening area of the opening part 5, and seals the opening part 5 in an airproof and liquidproof manner. A flange for fitting or a seal member may be provided in the cover member 33 and the opposing surface of the opening part 5. The sealing performance and the connection performance between the loader room 3 and the machining room 2 are thereby improved. A plurality of shafts 38 is provided on the surface of the cover member 33 on the opening part 5 side. Each of the shafts 38 projects in the direction of the loader room 3, and is provided in parallel with the Z axis direction. When the cover member 33 closes the opening part 5, the shafts 38 project to the loader room 3 through the opening part 5, as illustrated in FIG. 4. The leading end of the shaft 38 abuts on a plate stopper 6 provided in the loader room 3. The cover member 33 is thereby positioned to abut on the dividing wall 4.

Flanges 41 are provided in both sides of the base plate 34, respectively. The flange 41 is integrally provided with a collar 42. The collar 42 is inserted through the shaft 38. The base plate 34 is thereby connected to the cover member 33 to reciprocate relative to the cover member 33. A receiver 39 is attached to the outer circumference of the leading end part of the shaft 38. A coil spring 40 as a biasing member is attached between the receiver 39 and the base plate 34. The coil spring 40 is fitted on the shaft 38. As illustrated in FIG. 4, the workpiece holder 31 is biased in the position close to the cover member 33 by the coil spring 40 such that the collar 42 is normally pressed by the cover member 33.

Figure 3A:
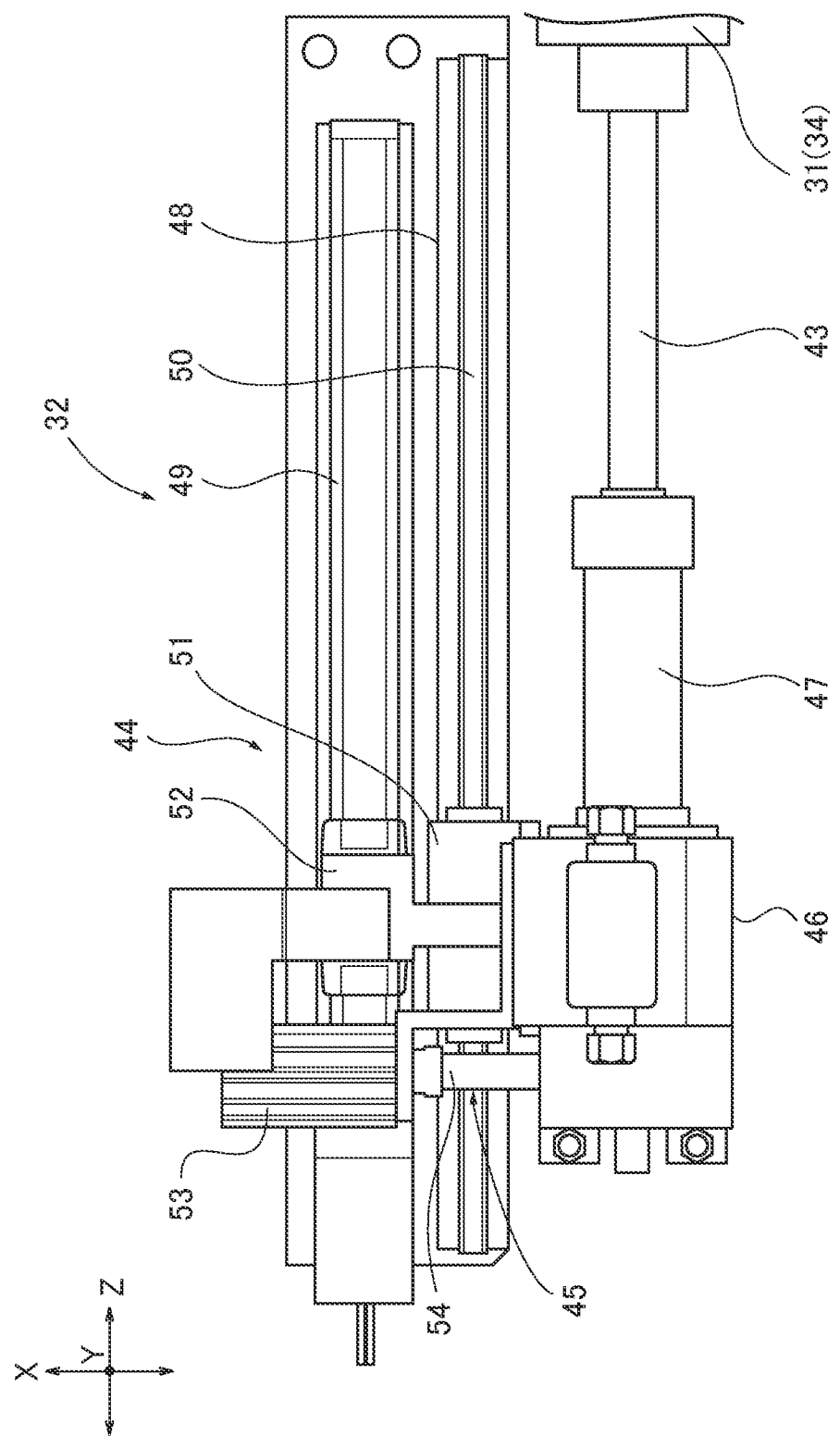
FIG. 3A is a plan view schematically illustrating a movement mechanism of the workpiece supply device illustrated in FIG. 1.

As illustrated in FIG. 3A, the movement mechanism includes a shaft 43, a slide mechanism 44, and a rotation mechanism 45. The shaft 43 is disposed to be parallel with the Z axis direction. The slide mechanism 44 reciprocates the shaft 43 in the Z axis direction. The rotation mechanism 45 rotates the shaft 43. The shaft 43 includes one end to which the base plate 34 is integrally fastened and the other end inserted into a sleeve 47 integrally fastened to a bracket 46. The shaft 43 is rotatably supported on the bracket 46 side.

The slide mechanism 44 includes a linear guide 48 and a slide door actuator 49. The linear guide 48 is disposed in parallel with the shaft 43 to be parallel with the Z axis direction. The linear guide 48 is provided with a slide rail 50 extending in the Z axis direction. The bracket 46 is movably supported by the slide rail 50 through a slide head 51. The bracket 46 is integrally fastened to a slider 52 provided in the slide door actuator 49. The rotation mechanism 45 includes a cylinder 53 integrally attached to the bracket 46. A cylinder shaft 54 of the cylinder 53 is connected to the shaft 43.

The movement mechanism 32 moves the slider 52 in the Z axis direction by driving the slide door actuator 49. The shaft 43 is guided by the linear guide 48 together with the bracket 46 to move in the Z axis direction by moving the slider 52. The rotation mechanism 45 rotates the shaft 43 about the axis line by driving the cylinder 53 to reciprocate the cylinder shaft 54.

The workpiece holder 31 passes through the opening part 5 to enter and leave the machining room 2 and the loader room 3 by the above-described control of the slide mechanism 44. On the other hand, the cover member 33 reciprocates only in the machining room 2, and does not move in the loader room 3. When the workpiece holder 31 moves in the loader room 3, the cover member 33 abuts on the dividing wall 4 to stop the movement. After the stop, the workpiece holder 31 moves in the direction of the holding position of the workpiece W along the Z axis against the biasing force of the coil spring 40 by further driving the slide mechanism 44.

The workpiece holder 31 is therefore freely moved to a position at which the workpiece W is easily held by the hands 37. For example, a workpiece W may differ in length of the axis line direction due to manufacturing errors, and a plurality of workpieces W having different lengths may be machined. Even in such cases, the workpiece W is easily held by the hands 37 by moving the workpiece holder 31 in the position at which the workpiece W is easily held by the hands 37 according to the length of the workpiece W.

By rotating the shaft 43 with the rotation mechanism 45, the workpiece holder 31 rotates about the axis line of the shaft 43 together with the cover member 33. The cover member 33 and the workpiece holder 31 thereby integrally swing to a position at which the workpiece W held by the hands 37 faces to the main spindle 10 in the machining room 2 by the rotation of the workpiece holder 31. The workpiece holder 31 passes through the opening part 5, and the cover member 33 and the workpiece holder 31 integrally swing to a position at which the loader head 36 faces the workpiece W held by the transfer device 22 in the loader room 3.

Figure 3B:
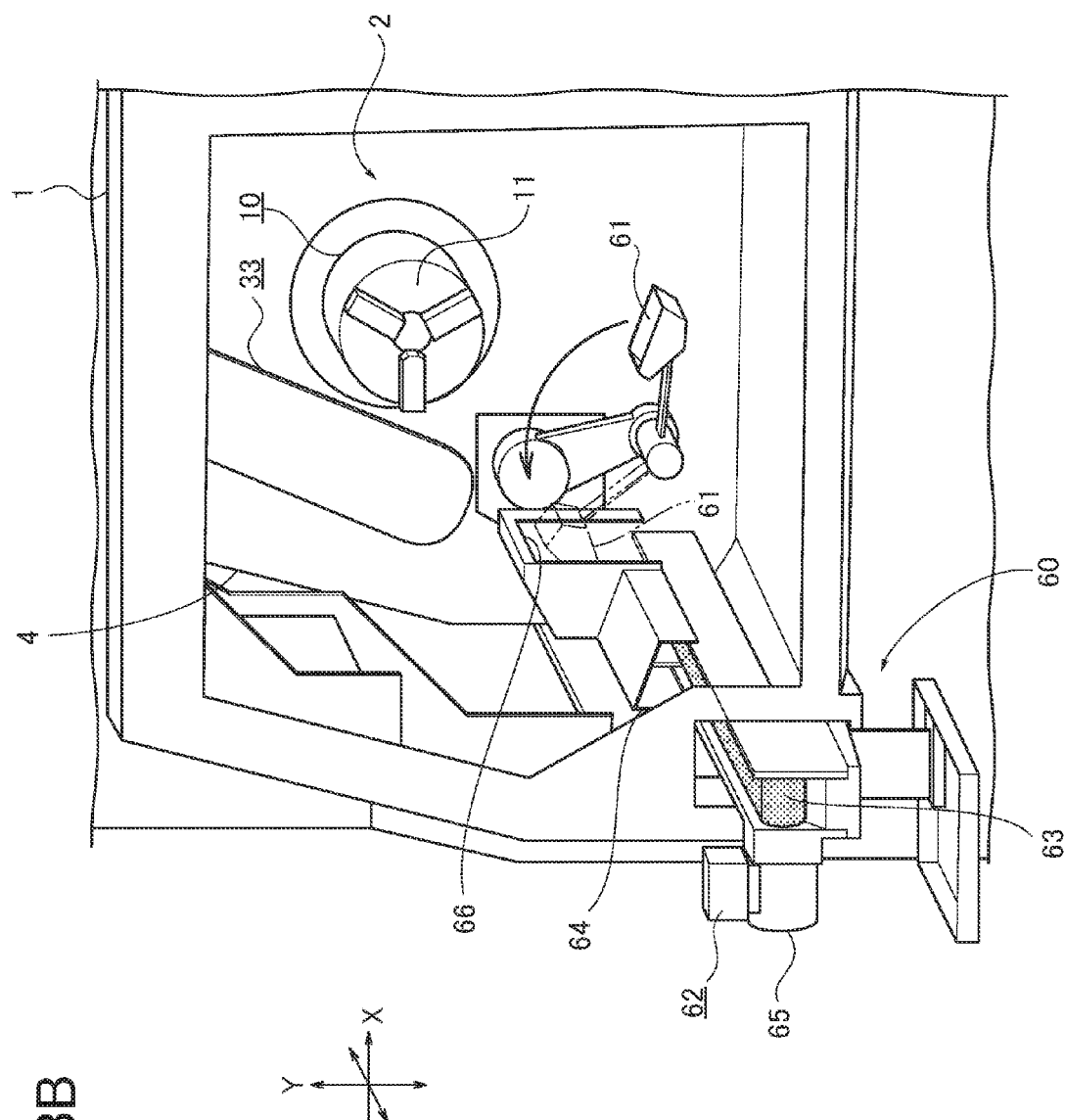
FIG. 3B is an enlarged perspective view illustrating a main part of an ejection device of the workpiece supply device illustrated in FIG. 1.

The main body 1 is provided with an ejection device 60 that ejects the machined workpiece W outside the main body 1. As shown in FIG. 3B, the ejection device 60 includes a workpiece receiver 61 as a basket and a conveyor device 62 for ejection. The workpiece receiver 61 receives the workpiece W ejected from the main spindle 10. The workpiece receiver 61 is rotatably supported by the dividing wall 4 with the axis parallel to the Z axis as the center axis. The conveyor device 62 sends the workpiece W from the workpiece receiver 61 outside. The conveyor device 62 includes a belt conveyor 63, a hood 64, and a driving mechanism 65. The hood 64 partially covers the belt conveyor 63. The driving mechanism 65 drives the belt conveyor 63.

After the machining of the workpiece W with the main spindle 10 is completed, the workpiece receiver 61 swigs in the direction of the main spindle 10, and stands by under the workpiece W held by the main spindle 10, as illustrated by the solid line in FIG. 3B. Next, the chuck 11 of the main spindle 10 opens. An ejector provided in the main spindle 10 operates to push the workpiece W out of the main spindle 10, so that the workpiece W falls in the workpiece receiver 61.

As illustrated by the two-dot chain line in FIG. 3B, the workpiece receiver 61 in which the workpiece W is housed swings in the direction of the hood 64 with the supported part as a rotation axis. The workpiece W is dropped in the hood 64 from a slot 66 which opens in the hood 64. The workpiece W dropped in the hood 64 is sent outside the main body 1 by the belt conveyor 63, and is ejected to a workpiece collecting part, for example.

Figure 5:
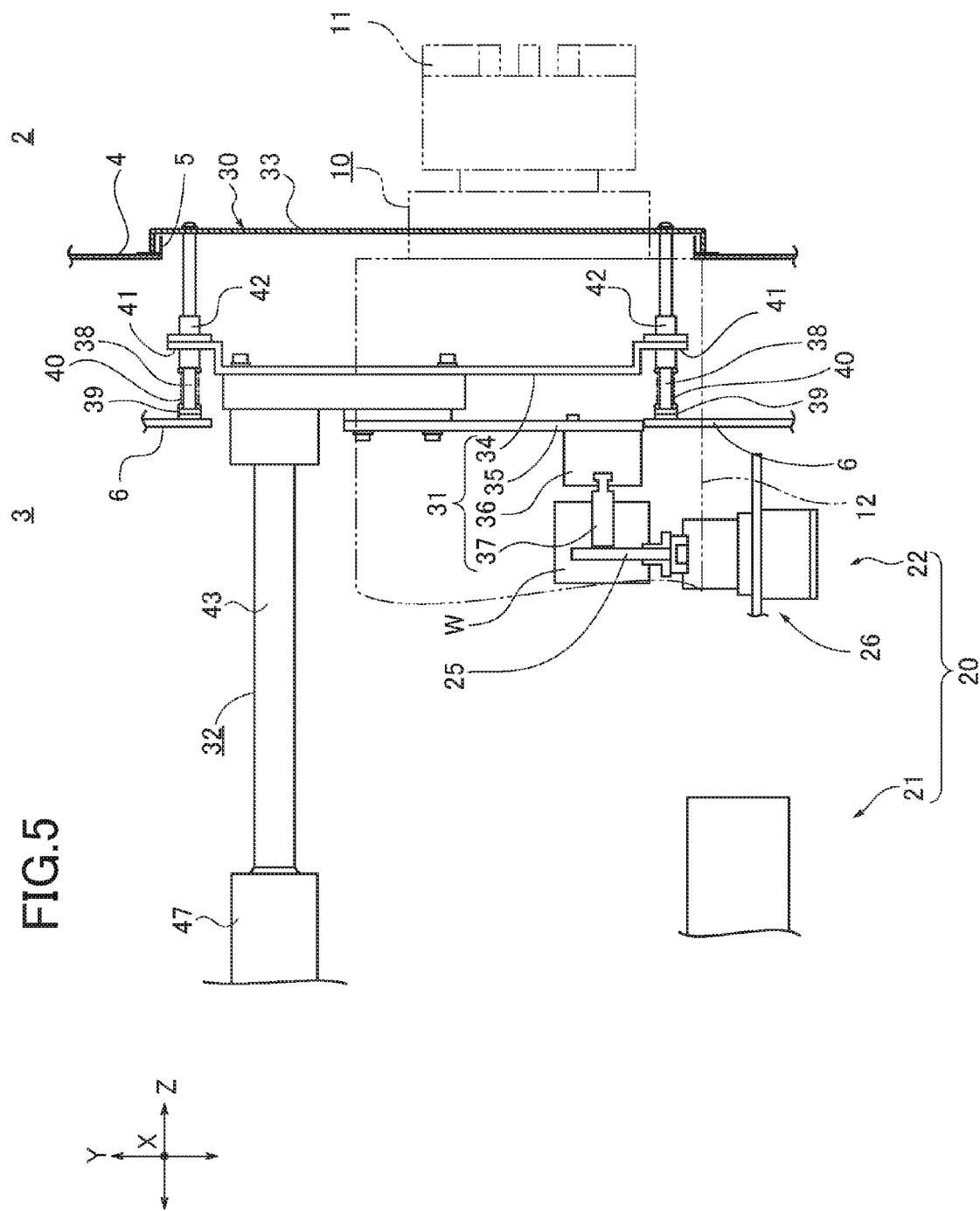
FIG. 5 is an operation view of the workpiece supply device illustrated in FIG. 1, and illustrating the workpiece held by hands of the workpiece holder.

Hereinafter, an operation for supplying a workpiece to the main spindle 10 by the workpiece supply device 30 will be described with reference to the operation views of FIGS. 4 to 6. The rotation mechanism 45 and the slide mechanism 44 of the movement mechanism 32 are omitted in these figures for simplifying the description.

FIG. 4 illustrates that the opening part 5 is covered by the cover member 33 of the workpiece supply device 30 to be closed. When the workpiece holder 31 moves to the loader room 3 by driving the slide mechanism 44, the leading end of the shaft 38 abuts on the stopper 6. The cover member 33 abuts on the dividing wall 4 to stop the movement, and is positioned while closing the opening part 5. The workpiece holder 31 is disposed in the loader room 3 with being biased on the cover member 33 side by the coil spring 40.

When the shaft 38 abuts on the stopper 6, the cover member 33 is positioned to have closely contact with the dividing wall 4, and closes the opening part 5. The force by which the cover member 33 has closely contact with the dividing wall 4 is received by the shaft 38 in addition to the contact portion of the cover member 33 with the dividing wall 4. The sealing performance between the loader room 3 and the machining room 2 is maintained without overload on the cover member 33. The workpiece W gripped by the main spindle 10 is machined in the machining room 2 while the opening part 5 is closed by the cover member 33. For example, the cutting fluid is therefore prevented from scattering in the loader room 3 from the machining room 2 during the machining.

On the other hand, the workpiece W is delivered by the conveyor device 21 of the delivery device 20 in the loader room 3 during the machining of the workpiece W in the machining room 2. The delivered workpiece W is disposed in the held position by the transfer device 22 of the delivery device 20, as illustrated in FIG. 4.

In the workpiece supply device 30, the slide mechanism 44 (see FIG. 3A) of the movement mechanism 32 drives to receive the workpiece W from the transfer device 22. The workpiece holder 31 moves in the direction of the workpiece W against the biasing force by driving the slide mechanism 44. As illustrated in FIG. 5, when the workpiece W is inserted between the open hands 37, the movement of the workpiece holder 31 stops. The workpiece W is held by the hands 37 by closing both of the hands 37. Next, the workpiece W is transferred from the transfer device 22 to the workpiece holder 31 by opening both of the hands 25 on the transfer device 22 side.

Next, the workpiece holder 31 moves in the direction of the cover member 33 by the slide mechanism 44 while the workpiece W is held by the hands 37. As the workpiece holder 31 moves in the direction of the workpiece W in the loader room 3, the coil spring 40 is compressed. The shaft 38 is pressed in the direction of the stopper 6 through the receiver 39 by the biasing force of the compressed coil spring 40. The cover member 33 is biased in the direction which closes the opening part 5, and the closed opening part 5 is maintained without separating the cover member 33 from the opening part 5. The sealing performance between the loader room 3 and the machining room 2 is therefore maintained, and for example, the cutting fluid is prevented from scattering from the machining room 2 to the loader room 3. The workpiece W is supplied to the workpiece holder 31 from the delivery device 20 in the loader room 3 under such a clean environment.

After the workpiece W is machined in the machining room 2 and is ejected, the workpiece W held by the hands 37 of the workpiece holder 31 is transferred to the main spindle 10 by the workpiece supply device 30. The workpiece supply device 30 therefore drives the slide mechanism 44, and moves the workpiece holder 31 in which the workpiece W is held in the direction of the machining room 2. The cover member 33 separates from the opening part 5 by the movement of the workpiece holder 31, and moves in the inside direction of the machining room 2 together with the workpiece holder 31. The workpiece holder 31 enters the machining room 2 from the open opening part 5.

Figure 6:
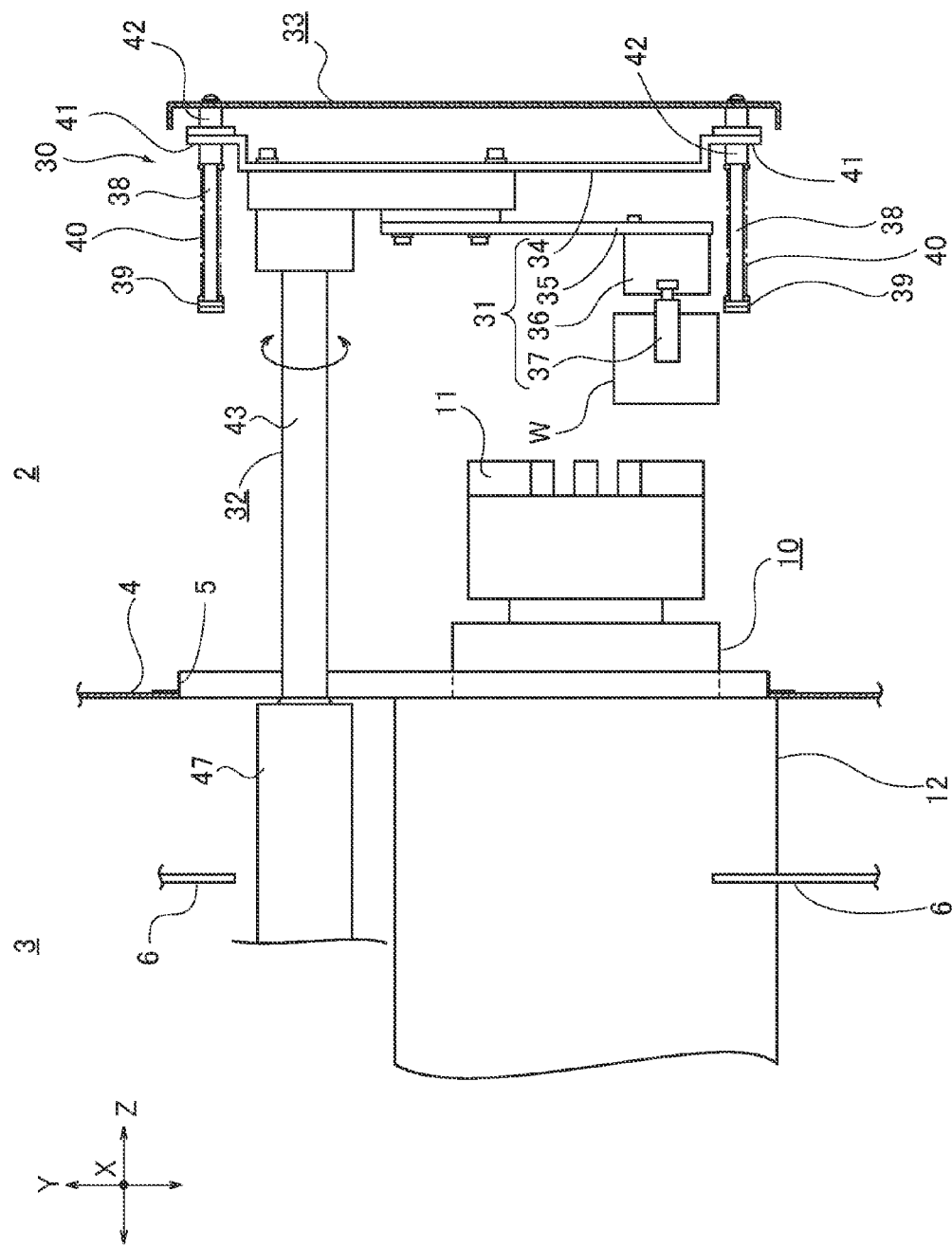
FIG. 6 is an operation view of the workpiece supply device illustrated in FIG. 1, and illustrating the workpiece holder holding the workpiece in a machining room.

As illustrated in FIG. 6, the movement of the workpiece holder 31 stops by the slide mechanism 44 with the workpiece W being disposed in front part of the main spindle 10. Next, the workpiece holder 31 swings together with the shaft 43 by the rotation mechanism 45 (see FIG. 3A). With the above operations, the loader head 36 is disposed such that the workpiece W faces the main spindle 10.

Next, the workpiece W is inserted in the open chuck 11 by moving the workpiece holder 31 in the direction of the main spindle 10 in the Z axis direction by the slide mechanism 44. Then, the chuck 11 of the main spindle 10 is closed, and the hands 37 of the workpiece holder 31 open to transfer the workpiece W to the main spindle 10. After that, the workpiece holder 31 moves in the direction away from the main spindle 10 in the Z axis direction. Next, the workpiece holder 31 swings together with the shaft 43 in the direction opposite to the rotation direction, and the workpiece holder 31 is positioned to pass through the opening part 5.

The supply of the workpiece W from the workpiece supply device 30 to the main spindle 10 is completed by the above operation. The workpiece supply device 30 moves the workpiece holder 31 in the loader room 3 through the opening part 5 by the slide mechanism 44. The opening part 5 is closed by the cover member 33 as shown in FIG. 4 by the movement of the workpiece holder 31.

After that, the workpiece W gripped by the main spindle 10 is machined with the tool of the tool post 14 in the machining room 2. The opening part 5 is closed by the cover member 33, so that the sealing performance between the loader room 3 and the machining room 2 is maintained. The cutting fluid, the moisture and the mist during the machining are therefore prevented from scattering in the loader room 3.

While the opening part 5 is closed, the workpiece W is machined in the machining room 2 and the workpiece W to be transferred to the main spindle 10 next is held by the workpiece holder 31 in the loader room 3. The workpiece W is therefore smoothly transferred to the main spindle 10 after the machining is completed.

As described above, according to the automatic lathe 100 including the workpiece supply device 30 of the present embodiment, the loader room 3 and the machining room 2 are sealed during the machining of the workpiece W. For example, the cutting fluid is thereby prevented from scattering in the loader room 3 from the machining room 2 during the machining of the workpiece. The sealing performance of the opening part 5 is maintained by the cover member 33. It becomes unnecessary to provide a shutter or a driver that closes the opening part 5 during the machining of the workpiece W as the conventional technique. It also becomes unnecessary to provide a space for the shutter and the driver. The number of components and assembling steps are thereby reduced to simplify and downsize the workpiece supply device 30 and the automatic lathe 100. The workpiece W is held by the workpiece holder 31 in parallel with the machining of the workpiece W. A time for the supply operation of the workpiece W to the main spindle 10 is thus reduced, and the operation efficiency of the workpiece supply is improved.

In the present embodiment, the workpiece holder 31 is connected to the cover member 33 in a reciprocatable manner. With this, the workpiece W is held even when the workpiece W differs in length in the axis line direction, or a plurality of workpieces having different lengths is machined.

The cover member 33 is biased in the direction which closes the opening part 5 by the biasing force of the coil spring 40. With this, the cover member 33 does not accidentally separate from the opening part 5, and the closed opening part 5 is maintained even when the workpiece holder 31 reciprocates. The cover member 33 is disposed in the machining room 2 to cover the opening part 5 from the inside of the machining room 2 to close the opening part 5. The cover member 33 moves only in the machining room 2 and does not move in the loader room 3. The cutting fluid adhered to the cover member 33 is thereby controlled from dropping in the loader room 3.

Although the embodiment of the present invention has been described above, the present invention is not limited thereto. It should be appreciated that variations may be included in the present invention without departing from the scope of the present invention.

A biasing member such as a plate spring and a torsion spring except the coil spring 40 may be used for the biasing member that biases the cover member 33 in the closing direction of the opening part 5 as long as it biases the cover member 33 without releasing the closing of the opening part 5 even when the workpiece holder 31 reciprocates. A biasing member such as an extension spring may be provided between the base plate 34 and the cover member 33. The cover member 33 may be biased in the closing direction of the opening part 5 by an extension force of the extension spring.

What is claimed is:

1. A workpiece supply device comprising:
   a workpiece holder that holds a workpiece to be supplied to a machine tool including a supplying area and a machining area of the workpiece, the workpiece holder entering and leaving both of the supplying area and the machining area through an opening part provided in a dividing wall between the supplying area and the machining area to transfer the workpiece with the machine tool;
   a slider that moves the workpiece holder between the supplying area and the machining area;
   a cover member that moves integrally with the workpiece holder and closes the opening part when the workpiece holder moves in the supplying area; and
   a biasing member that biases the cover member in a closing direction of the opening part, wherein the biasing member is configured to press the cover member to the dividing wall to close the opening part by the cover member such that the workpiece holder holds the workpiece in the supplying area while the workpiece is machined in the machining area, wherein:

the workpiece holder is connected to the cover member to reciprocate relative to the cover member, and is biased by the biasing member in a direction toward the cover member, and the workpiece holder moves in the supplying area against a biasing force of the biasing member, and holds the workpiece disposed in the supplying area with the opening part being closed by the cover member.

2. The workpiece supply device according to claim 1, wherein the cover member is disposed in the machining area, has an area larger than an opening area of the opening part, and covers the opening part from an inside of the machining area to close the opening part.

3. A machine tool including the workpiece supply device according to claim 1.

* * * * *